United States Patent
Papas et al.

(10) Patent No.: US 11,879,042 B2
(45) Date of Patent: Jan. 23, 2024

(54) FIRE RESISTANT THERMOPLASTIC-BASED RESIN FOR FIBER-REINFORCED COMPOSITES

(71) Applicant: B/E Aerospace, Inc., Winston-Salem, NC (US)

(72) Inventors: Paul Papas, West Hartford, CT (US); Matthew R. Pearson, Hartford, CT (US); Wenping Zhao, Glastonbury, CT (US); Theresa A. Hugener, Coventry, CT (US); Danielle L Grolman, Holden, MA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 102 days.

(21) Appl. No.: 17/391,902

(22) Filed: Aug. 2, 2021

(65) Prior Publication Data

US 2023/0033321 A1    Feb. 2, 2023

(51) Int. Cl.
*C08J 5/24* (2006.01)
*C08L 33/10* (2006.01)

(52) U.S. Cl.
CPC .............. *C08J 5/245* (2021.05); *C08J 5/243* (2021.05); *C08J 5/244* (2021.05); *C08L 33/10* (2013.01);
(Continued)

(58) Field of Classification Search
CPC ... C08L 2201/02; C08L 33/10; C08J 2485/02; C08J 2333/10; C08J 5/244; C08J 5/243; C08J 5/245
(Continued)

(56) References Cited

U.S. PATENT DOCUMENTS

| 3,347,818 A | 10/1967 | Lau |
| 3,450,631 A | 6/1969 | Bloch et al. |

(Continued)

FOREIGN PATENT DOCUMENTS

| CA | 2812249 A1 | 3/2012 |
| CN | 104448679 A | 3/2015 |

(Continued)

OTHER PUBLICATIONS

Tomioka et al., JP 2016-172834 A machine translation in English, Sep. 29, 2016 (Year: 2016).*
(Continued)

*Primary Examiner* — David T Karst
(74) *Attorney, Agent, or Firm* — Suiter Swantz pc llo

(57) ABSTRACT

A first composition is disclosed that includes a fire-resistant thermoplastic resin. The fire-resistant thermoplastic resin includes 1-20 wt % of an aryl phosphate, includes 1-20 wt % of a phosphate polymer, and 60%-98% of a (meth)acrylic polymer, including units from at least one monomer, wherein the monomer is chosen from methyl methacrylate, acrylic acid, methacrylic acid, acrylic acid esters, methacrylic acid esters, acrylonitrile and maleic anhydride. The first composition may further include a fabric or a composite material that is embedded with the fire-resistant thermoplastic resin. In some instances, the aryl-phosphate and the phosphonate polymer synergistically reduce an effective heat of combustion, a peak heat release, or a flame time as compared to a second composition that contains only one of the aryl phosphate or the phosphonate polymer.

13 Claims, 4 Drawing Sheets

(52) U.S. Cl.
CPC ........ *C08J 2333/10* (2013.01); *C08J 2485/02* (2013.01); *C08L 2201/02* (2013.01)

(58) Field of Classification Search
USPC .......................................................... 523/222
See application file for complete search history.

(56) References Cited

U.S. PATENT DOCUMENTS

| | | | |
|---|---|---|---|
| 3,666,712 A | 5/1972 | Weil | |
| 3,920,619 A | 11/1975 | Kameda et al. | |
| 6,861,499 B2 | 3/2005 | Vinciguerra et al. | |
| 7,816,486 B2 | 10/2010 | Freitag et al. | |
| 8,222,330 B2 | 7/2012 | Lee et al. | |
| 10,428,213 B2 | 10/2019 | Ishihara et al. | |
| 2013/0274378 A1* | 10/2013 | Muller | B29C 48/297 523/324 |
| 2017/0022358 A1 | 1/2017 | Schrauwen | |
| 2022/0259421 A1* | 8/2022 | Lee | C08K 7/14 |

FOREIGN PATENT DOCUMENTS

| | | | | |
|---|---|---|---|---|
| CN | 105111659 A | 12/2015 | | |
| CN | 109021842 A | 12/2018 | | |
| EP | 0104479 B1 | 11/1987 | | |
| EP | 1838785 A1 | 10/2007 | | |
| EP | 3181602 A1 | 6/2017 | | |
| GB | 1353195 A | 5/1974 | | |
| GB | 1395780 A | 5/1975 | | |
| GB | 1418540 A | 12/1975 | | |
| GB | 1512404 A | 6/1978 | | |
| JP | S63117056 A | 5/1988 | | |
| JP | S63152609 A | 6/1988 | | |
| JP | H0149181 B2 | 10/1989 | | |
| JP | H0149182 B2 | 10/1989 | | |
| JP | H04227954 A | 8/1992 | | |
| JP | 5827862 B2 | 12/2015 | | |
| JP | 2016172834 A | * | 9/2016 | ................ C08J 5/06 |
| JP | 2017128685 A | 7/2017 | | |
| KR | 960001029 A | 1/1996 | | |
| KR | 0144382 B1 | 7/1998 | | |
| KR | 100767428 B1 | 10/2007 | | |
| WO | WO-2021020741 A1 | * | 2/2021 | .......... C08F 220/325 |

OTHER PUBLICATIONS

Extended European Search Report in European Application No. 22186563.7 dated Jan. 5, 2023, 81 pages.

* cited by examiner

Carbon Fiber Fabric + 20% RDP

| Sample | Ignition Time (sec) | Flame Time (sec) | Drip Flame Time (sec) | Burn Length (inch) |
|---|---|---|---|---|
| 1 | 12.0 | 1.3 | 0.0 No Drips | 0.2 |
| 2 | 12.0 | 1.0 | 0.0 No Drips | 0.2 |
| 3 | 12.0 | 0.0 | 0.0 No Drips | 0.2 |
| Average: | | 0.8 | 0.0 | 0.2 |
| Result: | | PASS | PASS | PASS |

Carbon Fiber Fabric + 15% RDP/15% Phosphonate Polymer

| Sample | Ignition Time (sec) | Flame Time (sec) | Drip Flame Time (sec) | Burn Length (inch) |
|---|---|---|---|---|
| 1 | 12.0 | 0.0 | 0.0 No Drips | 0.2 |
| 2 | 12.0 | 0.0 | 0.0 No Drips | 0.2 |
| 3 | 12.0 | 0.0 | 0.0 No Drips | 0.2 |
| Average: | | 0.0 | 0.0 | 0.2 |
| Result: | | PASS | PASS | PASS |

FIG. 2B

FIRE RESISTANT THERMOPLASTIC-BASED RESIN FOR FIBER-REINFORCED COMPOSITES

BACKGROUND

Thermoplastic resins include polymers that can be melted and recast into various shapes. The polymers are molten when heated and hardened upon cooling in a process commonly referred to as reaction injection molding (RIM) or reinforces reaction injection molding (RRIM) if reinforcement agents are used. Thermoplastic resins can be added to layered, composite structures in a structural reaction injection molding (SRIM) process, in which upon curing and hardening, can reinforce the composite structure considerably, creating structures having strength characteristics similar to metal structures, but with considerably lower weight, making SRIM products ideal for aircraft components and other weight sensitive industries.

When used in aircraft components such as passenger seats, SRIM products must adhere to strict fire-resistant standards, such as those imposed by the United States Federal Aviation Administration (FAA). Traditional fire retardants added to components used in aircraft, such as polybrominated diphenyl ether (PBDE) and Tetrabromobisphenol A (TBBPA), are currently being phased out due to environmental concerns. Thermoplastic resins that contain non-toxic fire-retardant compounds that are resistant to the RIM techniques and do not leach out of composite structures have not been well established. Accordingly, there is a need for a thermoplastic resin with a non-toxic fire-retardant compatible with SRIM techniques.

SUMMARY

A first composition is disclosed. In one or more embodiments, the first composition includes a fire-resistant thermoplastic resin. In one or more embodiments, the fire-resistant thermoplastic resin includes 1-20 wt % of an aryl phosphate. In one or more embodiments, the fire-resistant thermoplastic resin includes 1-20 wt % of a phosphate polymer. In one or more embodiments, the 60%-98% of a (meth)acrylic polymer, including units resulting from at least one monomer. In one or more embodiments, the monomer is chosen from methyl methacrylate, acrylic acid, methacrylic acid, acrylic acid esters, methacrylic acid esters, acrylonitrile and maleic anhydride.

In some embodiments of the first composition, at least one of a fabric or a composite material is embedded with the fire-resistant thermoplastic resin.

In some embodiments of the first composition, at least one of the fabric or the composite material comprises at least one of a carbon fiber, a glass fiber, or a natural fiber.

In some embodiments of the first composition, the at least one of the fabric or the composite material is configured to pass flame requirements as 14 C.F.R. § 25.583 and corresponding Appendix F.

In some embodiments of the first composition, the first composition further comprises an anti-drip agent.

In some embodiments of the first composition, the fire-resistant thermoplastic resin further comprises a colorant.

In some embodiments of the first composition, wherein the acyl phosphate is configured as resorcinol bis(diphenyl phosphate), triphenyl phosphate, or isopropylated triphenyl phosphate In some embodiments of the first composition, at least one of the fabric or the composite material is infused within the fire-resistant thermoplastic resin before at least one of the phosphonate polymer or the (meth)acrylic polymer is polymerized.

In some embodiments of the first composition, the fire-resistant thermoplastic resin further comprises a polymerization initiator.

In some embodiments of the first composition, initiator is configured as a peroxide.

In some embodiments of the first composition, the polymerization of at least one of the phosphonate polymer or the (meth)acrylic polymer is performed between 10° C. and 40° C.

In some embodiments of the first composition, at least one of an effective heat of combustion, a peak heat release, or a flame time of the first composition is less than a second composition comprising only the aryl phosphate or the phosphonate polymer, wherein the total weight percentage of the aryl phosphate or the phosphonate polymer in the second composition is equivalent to the total weight percentage of the aryl phosphate and the phosphonate polymer in the first composition.

A third composition is also disclosed. In one or more embodiments, the third composition includes a fire-resistant thermoplastic resin. In one or more embodiments, the fire-resistant thermoplastic resin includes 1-25 wt % of an aryl phosphate or a phosphonate polymer. In one or more embodiments, the fire-resistant thermoplastic resin further includes 75-98 wt % of a (meth)acrylic polymer, including units resulting from at least one monomer, wherein the monomer is chosen from methyl methacrylate, acrylic acid, methacrylic acid, acrylic acid esters, methacrylic acid esters, acrylonitrile and maleic anhydride.

In some embodiments of the third composition, the third composition further includes at least one of a fabric or a composite material, wherein the at least one of the fabric or the composite material is embedded with the fire-resistant thermoplastic resin.

In some embodiments of the third composition, the at least one of the fabric or the composite material comprises at least one of a carbon fiber, a glass fiber, or a natural fiber.

In some embodiments of the third composition, at least one of the fabric or the composite material is configured to pass flame requirements as 14 C.F.R. § 25.583 and corresponding Appendix F.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2B illustrates a table containing vertical flammability test results for a carbon fiber fabric embedded with a fire-resistant thermoplastic resin containing 15% RDP and 15% phosphonate polymer, in accordance with one or more embodiments of the disclosure.

DETAILED DESCRIPTION

Figure 1:
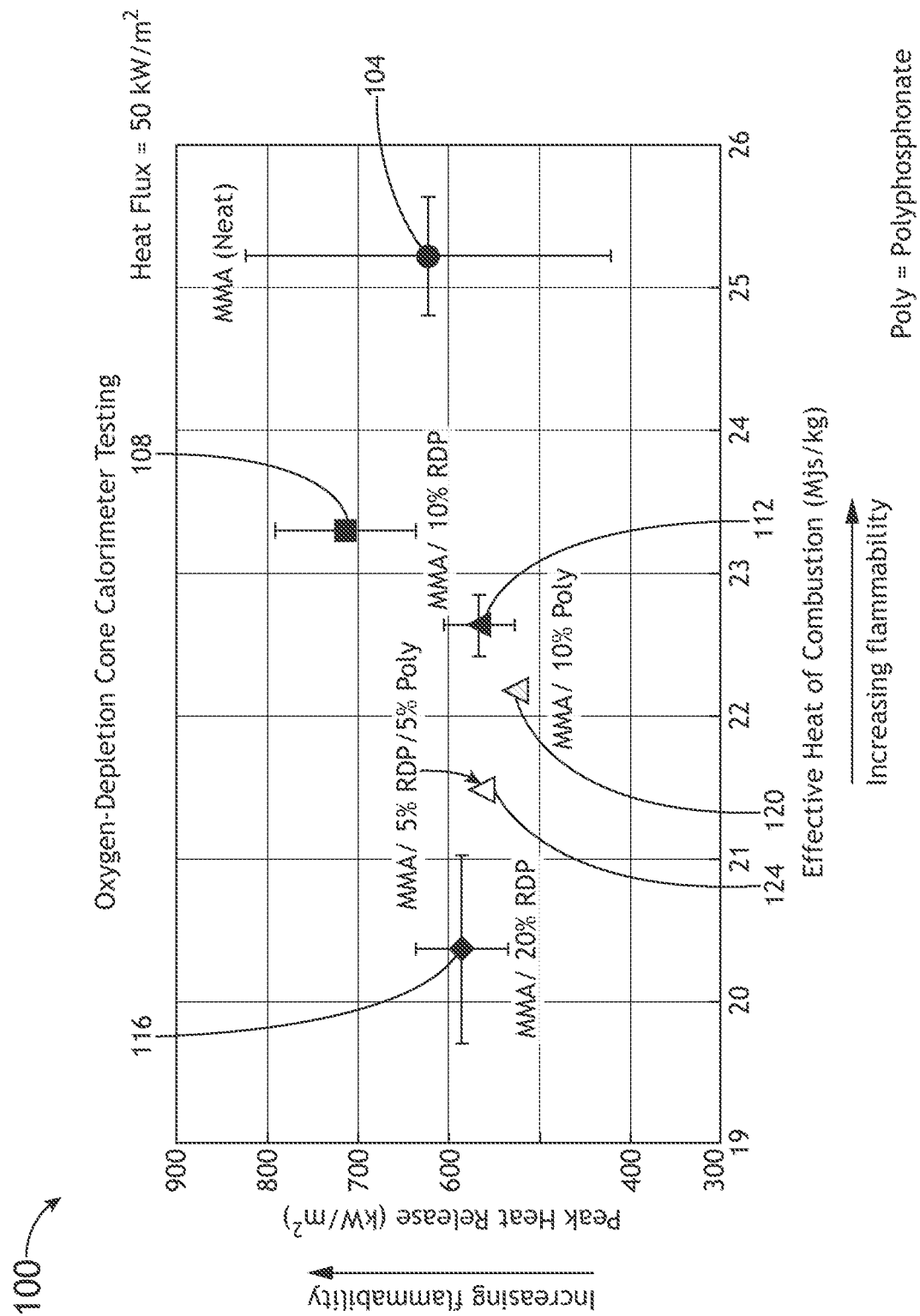
FIG. 1 is a graph illustrating the effect of the addition of the acyl phosphate RDP and/or phosphonate polymer on the FIG. 2A illustrates a table containing vertical flammability test results for a carbon fiber fabric embedded with a fire-resistant thermoplastic resin containing 20% RDP, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Compositions comprising a fire-resistant thermoplastic resin are disclosed. The fire-resistant thermoplastic resin comprises an aryl phosphate and a phosphonate polymer (e.g., a first composition), or an aryl phosphate or a phosphonate polymer (e.g., a second composition and/or third composition), that when embedded in a fabric or composite material, renders the fabric or composite material flame resistant. The fire-resistant thermoplastic resin also stabilizes the formed structure of the compositions.

In some embodiments, the fire-resistant thermoplastic resin comprises a (methyl)acrylic polymer. The (meth)acrylic polymer may include poly alkyl methacrylates, poly alkylacrylates, or other species. For example, the (methyl)acrylic polymer may be configured as poly methyl methacrylate (PMMA) formed from at least one monomer. The monomers forming the (meth)acrylic polymer, or units containing two or more polymerized monomers, may include any chemically appropriate monomer including but not limited to methacrylate, acrylic acid, methacrylic acid, acrylic acid esters, methacrylic acid esters, acrylonitrile and maleic anhydride. The (meth)acrylic polymer and/or (meth)acrylic monomer may come from any source or vendor. For example, the source of the (meth)acrylic polymer and (meth)acrylic monomer may be configured as the Elium® (meth)acrylic monomer/polymer solutions vended by the Arkema company. For instance, the Elium® solutions include 10-60 wt % (weight percentage) (meth)acrylic polymer dissolved in 40-90% wt % (meth)acrylic monomer.

In some embodiments, the overall percentage of (meth)acrylic polymer within the fire-resistant thermoplastic resin may fall within a range. For example, the overall weight percentage of (meth)acrylic polymer in the fire-resistant thermoplastic resin may range from 20 wt % to 98 wt %, 50 wt % to 98 wt %, 60 wt % to 98 wt %, 60 wt % to 90 wt %, 65 wt % to 85 wt %, and 70 wt % to 80 wt %. For instance, the overall weight percentage of (meth)acrylic polymer in the fire-resistant thermoplastic resin may be approximately 60%. When considering the overall percentage of (meth)acrylic polymer by weight percentage within the fire-resistant thermoplastic resin, we are assuming that the polymerization process has converted the vast majority of (meth)acrylic monomers into a (meth)acrylic polymer form. Therefore, the overall percentage of (meth)acrylic polymer in the fire-resistant thermoplastic as stated above is a post-polymerization weight percentage.

In some embodiments, the (meth)acrylic polymer may be polymerized before or after addition of the (meth)acrylic polymer into the first composition. For example, unpolymerized or partially polymerized (meth)acrylic polymer may be added to the first composition and allowed to cure. Alternatively, the unpolymerized or partially polymerized (meth)acrylic polymer may be allowed polymerize partially or fully before addition of the (meth)acrylic polymer into the first composition.

Polymerization of the (meth)acrylic polymer may be initiated by an initiator. For example, the initiator may include an organic peroxide. For instance, the initiator may include benzoyl peroxide. The type and concentration of initiator facilitates the temperature, or range of temperatures, at which polymerization (e.g., curing) of the (meth)acrylic monomer may occur. For example, the polymerization of the (meth)acrylic monomer may occur in ranges including but not limited to 0° C. to 100° C., 0° C. to 50° C., 10° C. to 40° C., and 20° C. to 30° C. For example, the polymerization of the (meth)acrylic monomer may occur at room temperature (e.g., approximately 25° C.). The polymerizing temperature of the (meth)acrylic monomer in the fire-resistant thermoplastic resin is considerably lower than the traditional (meth) acrylic polymerizing solutions, allowing the fire-resistant thermoplastic resin to be embedded materials that are unstable at higher temperatures.

In some embodiments, the fire-resistant (e.g., flame resistant) thermoplastic resin comprises an aryl phosphate configured to act as a fire retardant. The fire-resistant thermoplastic resin may include any type of any fire-retardant aryl including but not limited to Triphenyl Phosphate (TPP), Isopropylated triphenyl phosphate (PrTPP), Isodecyl diphenyl phosphate (IDPP), Tricresyl Phosphate (TCP), 2-ethylhexyl diphenyl phosphate (EHDP), Isopropyl phenyl diphenyl phosphate, Tert-butylated triphenyl phosphate (BuTTP), and resorcinol bis (diphenyl phosphate) (RDP). For example, the aryl phosphate may include RDP as included in the product AFLAMMIT® PLF 280 vended by the Thor company. The aryl phosphate included in the fire-resistant thermoplastic resin may be halogen-free.

In some embodiments, the overall percentage of aryl phosphate within the fire-resistant thermoplastic resin may fall within a range. For example, the overall weight percentage of aryl phosphate in the fire-resistant thermoplastic resin may range from 1% to 25 wt %, 2 wt % to 20 wt %, 5 wt % to 15 wt %, and 8 wt % to 12 wt %, 65 wt % to 85 wt %, and 70 wt % to 80 wt %. For instance, the overall weight percentage of aryl phosphate in the fire-resistant thermoplastic resin may be approximately 10%. In another instance, the overall weight percentage of aryl phosphate in the fire-resistant thermoplastic resin may be approximately 15%.

In some embodiments, the fire-resistant thermoplastic resin comprises a polyphosphate polymer (e.g., polyphosphonate) configured to act as a fire retardant. The fire-resistant thermoplastic resin may include any type of fire-retardant phosphonate polymer including but not limited to aryl polyphosphonates, aliphatic polyphosphonates, aromatic polyphosphonates, and those described in U.S. Pat. Nos. 8,975,367, 6,861,499 and 7,816,486, all of which are hereby incorporated by reference in their entireties. In certain embodiments, the phosphonate polymer may be characterized as exhibiting at least one, and preferably all of a broad molecular weight, and a $T_g$ of at least 100° C. In some embodiments, the phosphonate polymer may have a $T_g$ of about 25° C. to about 140° C., about 50° C. to about 135° C., or about 75° C. to about 130° C. These phosphonate polymers may exhibit a weight average molecular weight ($M_w$) ranging from about 100 g/mole to about 200,000 g/mole 1,000 g/mole to about 200,000 g/mole, about 10,000 g/mole to about 200,000 g/mole, about 12,000 g/mole to about 150,000 g/mole, about 15,000 g/mole to about 140,000 g/mole, about 20,000 g/mole to about 100,000 g/mole or any value between theses ranges based on polystyrene standards. For example, the weight average molecular weight ($M_w$) of about 10,000 g/mole to about 100,000 g/mole. For instance, the phosphonate polymer may include the reactive, phenolic phosphonate polymer Nofia® OL1001, and/or the homopolymer Nofia® HM1100, both vended by the FRX Polymers company. The polyphosphate included in the fire-resistant thermoplastic resin may be halogen-free.

In some embodiments, the phosphonate polymer may be polymerized before or after addition of the phosphonate polymer into the first composition. For example, unpolymerized or partially polymerized phosphonate polymer may be added to the first composition and allowed to cure. Alternatively, the unpolymerized or partially polymerized phosphonate polymer may be allowed to polymerize partially or fully before addition of the phosphonate polymer into the first composition.

In some embodiments, the overall percentage of phosphonate polymer within the fire-resistant thermoplastic resin may fall within a range. For example, the overall weight percentage of phosphonate polymer in the fire-resistant thermoplastic resin may range from 1% to 25 wt %, 2 wt % to 20 wt %, 5 wt % to 15 wt %, and 8 wt % to 12 wt %, 65 wt % to 85 wt %, and 70 wt % to 80 wt %. For instance, the overall weight percentage of phosphonate polymer in the fire-resistant thermoplastic resin may be approximately 10%. For instance, the overall weight percentage of phosphonate polymer in the fire-resistant thermoplastic resin may be approximately 15%.

In some embodiments, the first composition includes a fabric or a composite material embedded with the fire-resistant thermoplastic resin. The fabric or composite material may include any type of material than can be embedded with a resin including, but not limited to, synthetic fibers (e.g., carbon fiber, glass fiber, aramid fiber) or natural fibers (e.g., cotton, wool, and flax). The first composition may be configured as any type of structure. For example, the first composition may be configured as an interior structure of an aircraft, train, or boat; or automobile (e.g., structures having fire-retardant requirements). For instance, the first composition may be configured as a frame component of a passenger seat. In another instance, the first composition may be configured as a material covering a seatback of the passenger seat.

In some embodiments, the first composition and/or the fire-resistant thermoplastic resin meets and/or exceeds transportation guidelines and/or standards, such as aviation guidelines and/or standards, by being configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, the fire-resistant thermoplastic resin and/or composition (e.g., chair frame section and/or seat back fabric) may be required to meet and/or exceed flame tests as set forth by the aviation guidelines and/or standards. For instance, the passenger seat components may be rated to pass flame requirement tests for aircraft cabin interior installations (e.g., structures or components) such as seat cushions as set forth by the aviation guidelines and/or standards under 14 C.F.R. Part 25 and its Appendixes (e.g., 14 C.F.R. § 25.853, also found in FAA Advisory Circular (AC) 25.853-1), or the like.

The present application will be further illustrated with reference to the following examples of fire-resistant thermoplastic resin, which are not intended to limit the scope of the present application.

In some embodiments, the fire-resistant thermoplastic resin further includes an anti-drip component that prevents flame drips. The anti-drip component may include any known anti-drip additive including, but not limited to, polytetrafluoroethylene, perfluorocarbons, and acrylonitrile-butadiene-styrene copolymer. The fire-resistant thermoplastic resin may also include any synergists or blend partners to improve flammability and/or mechanical properties. In some embodiments, the fire-resistant thermoplastic resin further includes a colorant. Any type of colorant known may be included within the fire-resistant thermoplastic resin including, but not limited to, carbon black.

FIG. 1 is a graph 100 illustrating the effect of the addition of the acyl phosphate RDP and/or phosphonate polymer (poly) on the peak heat release and effective heat combustion on a test coupon (e.g., a piece of material embedded with components of the fire-resistant thermoplastic resin, including methyl methacrylate (MMA)) via an oxygen-depletion cone calorimeter test, in accordance with one or more embodiments of the disclosure. A fire hazard in an aircraft cabin may be considered as a function of the effective heat of combustion of the cabin materials and as the rate at which this heat is released by the burning material in a fire. Therefore, the effective heat of combustion and/or the peak heat release may be used as an indicator of fire-resistance of a composition. For example, for the control test coupon 104, embedded only with the (meth)acrylic polymer, the control coupon exhibits an unpredictable peak heat release and a considerably high effective heat of combustion, suggesting the control coupon would not be effectively fire-resistant and may fail aviation guidelines or standards.

The addition of RDP as the singular fire-retardant to the test coupon results in an approximately linear monotonic increasing improvement in reducing the effective heat of combustion. For example, the addition of 5% RDP 108 to the test coupon reduced the effective heat of combustion from approximately 25 MJ/kg to approximately 23.3 MJ/kg. In another example, the addition of 10% RDP 112 to the test coupon further reduced the effective heat of combustion to approximately 22.8 MJ/kg. In another example, the addition of 20% RDP 116 to the test coupon further reduced the effective heat of combustion to approximately 20.4 MJ/kg. The addition of phosphonate polymer (Poly) as the singular fire-retardant to the test coupon also reduced the effective heat of combustion. For example, the addition of 10% phosphonate polymer (10% poly 120) to the test coupon reduced the effective heat of combustion to approximately 22.3 MJ/kg.

The reduction of the effective heat of combustion by the aryl phosphate RDP and the polyphosphate is expected, as both PDP and polyphosphate are known fire-retardants. However, the addition of 5% RDP/5% phosphonate polymer 124 to the test coupon decreased the effective heat of combustion further than either the 10% RDP 112 and 10% poly 120, suggesting a greater than expected synergistic relationship exist between the addition of the aryl phosphate and the phosphonate polymer in reducing the effective heat of combustion. This results also suggests that a first composition containing a mixture of an aryl phosphate and a phosphonate polymer may have fire-resistant characteristics (e.g., lower effective heat of combustion, lower peak heat release, or a lower flame duration time) that surpass, or are synergistic to, the fire-resistance characteristics for a second composition containing either the aryl phosphate or the phosphonate polymer, wherein the total weight percentage of the aryl phosphate or the phosphonate polymer in the second composition is equivalent to the total weight percentage of the aryl phosphate and the phosphonate polymer in the first composition.

FIG. 2A illustrates a table 200 containing vertical flammability test results for a carbon fiber fabric embedded with a fire-resistant thermoplastic resin containing 20% RDP, in accordance with one or more embodiments of the disclosure. In the vertical flammability test, a test specimen, such as a test coupon, is positioned vertically above a controlled flame and exposed for a specified period of time (e.g., twelve seconds). Following exposure, the flame source is removed. Measurements are made on the length of time that the specimen continues to flame (Flame Time), charring of the specimen (Burn Length), and the number and/or timing of drips (Drip Flame Time). For the carbon fiber fabric embedded with the fire-resistant thermoplastic resin containing 20% RDP that was tested, no drips were evident, burn length was minimal (0.2 inches/5 mm), and a passing flame time of 0.8 seconds was determined after three runs.

FIG. 2B illustrates a table 220 containing vertical flammability test results for a carbon fiber fabric embedded with a fire-resistant thermoplastic resin containing 15% RDP and 15% phosphonate polymer, in accordance with one or more embodiments of the disclosure. Similar to the results in FIG. 2A, the carbon fiber fabric embedded with a fire-resistant thermoplastic resin containing 15% RDP and 15% phosphonate polymer recorded no flame drips and a minimal burn length of 0.2 inches/5 mm. However, the carbon fiber fabric embedded with a fire-resistant thermoplastic resin containing 15% RDP and 15% phosphonate polymer presented a markedly improved flame time than the carbon fiber fabric embedded with the fire-resistant thermoplastic resin containing 20% RDP (0.0 second versus 0.8 seconds). These results provide further evidence that the mixture of an aryl phosphate and/or a phosphonate polymer within a thermoplastic resin provides considerable fire-resistance protection when embedded within a fabric or composite material, and that the aryl phosphate and/or phosphonate polymer may act synergistically when compared to fire-resistance thermoplastic resins containing only the aryl phosphate or the phosphonate polymer.

Figure 3:
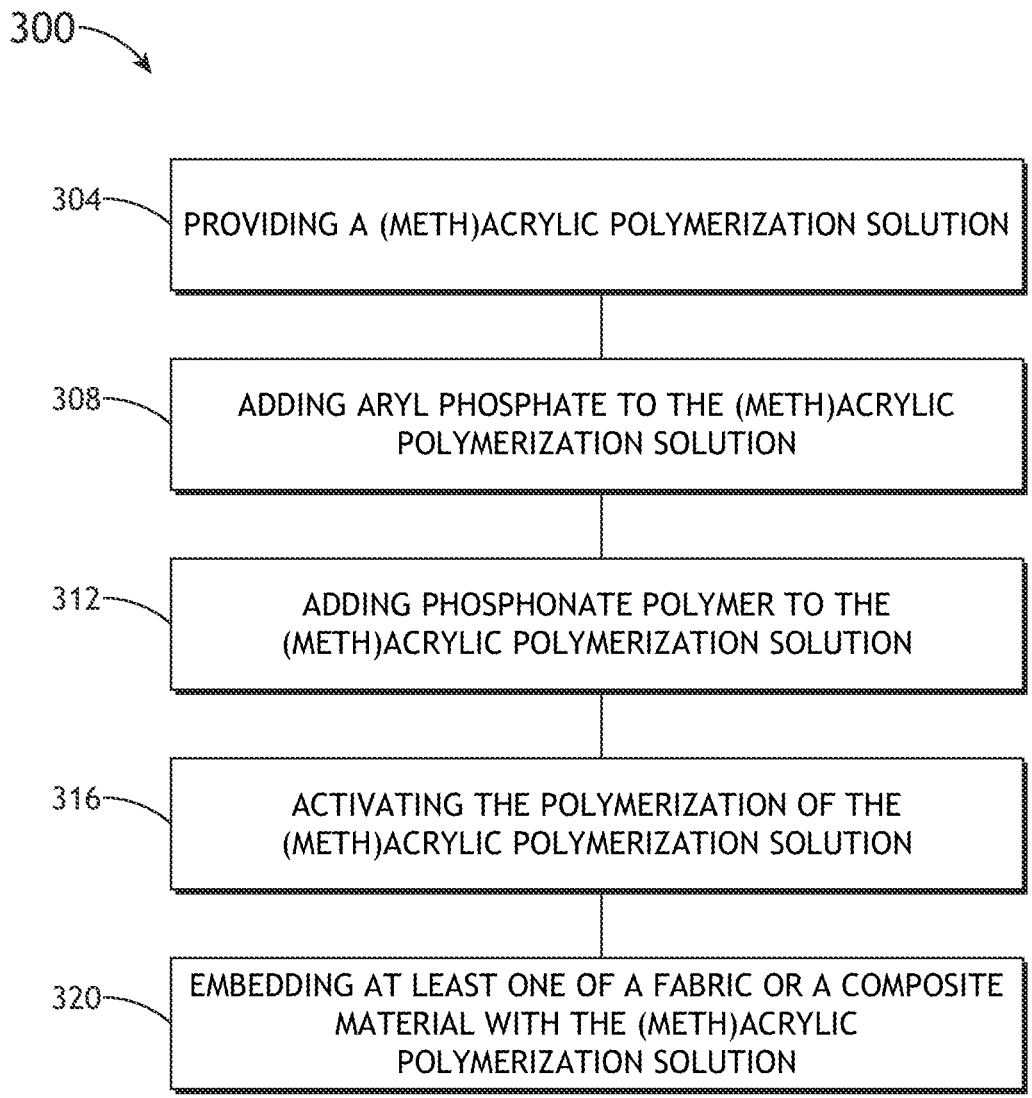
FIG. 3 is a flow chart illustrating a method for producing a fabric or a composite material embedded with the fire-resistant thermoplastic resin, in accordance with one or more embodiments of the disclosure.

FIG. 3 is a flow chart illustrating a method 300 for producing a fabric or a composite material embedded with the fire-resistant thermoplastic resin, in accordance with one or more embodiments of the disclosure. In some embodiments, the method 300 includes a step 304 of providing a (meth)acrylic polymerization solution. The (meth)acrylic polymerization solution may contain any (meth)acrylic polymerization solution as described herein. For example, the (meth)acrylic polymerization solution may include the Elium® (meth)acrylic monomer/polymer solutions vended by the Arkema company.

In some embodiments, the method 300 includes a step 308 of adding aryl phosphate to the (meth)acrylic polymerization solution. The aryl phosphate may include any type of aryl phosphate as described herein. For example, the aryl phosphate may include RDP.

In some embodiments, the method 300 includes a step 312 of adding phosphonate polymer to the (meth)acrylic polymerization solution. The phosphonate polymer may include any type of phosphonate polymer as described herein. For example, the phosphonate polymer may include the phosphonate polymer Nofia® OL1001 vended by the FRX Polymers company.

In some embodiments, the method 300 includes a step 316 of activating the polymerization of the (meth)acrylic polymerization solution. For example, the polymerization of the (meth)acrylic polymerization solution may include adding an initiator, such as a peroxide, into the (meth)acrylic polymerization solution in order to polymerize the (meth)acrylic monomers. In some cases, step 316 may also include the addition of initiators for the polymerization of phosphonate monomers. The polymerization of the (meth)acrylic monomer and the polymerization of the phosphate may occur simultaneously or at different times, or different steps within the method 300.

In some embodiments, the method 300 includes a step 320 of embedding at least one of a fabric or a composite material with the (meth)acrylic polymerization solution. The embedding of the fabric or composite material by the (meth)acrylic polymerization solution may be facilitated by any method known in the art including but not limited to RIM, RRIM, SRIM, or any other type of reaction injection molding, or injection molding process. The fabric or composite material may include any type of fabric or composite material as described herein. Polymerization of the (meth)acrylic monomer and/or the phosphonate monomer may be initiated before, during, or after step 320. Polymerization of the (meth)acrylic monomer and/or the phosphonate monomer may be terminated before, during, or after step 320.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. For example, it should be understood that one or more, or all components of the first composition may be included within the second composition and/or third composition, and vice versa. Furthermore, any dimensions, degrees, and/or numerical ranges provided herein are to be understood as non-limiting examples unless otherwise specified in the claims.

What is claimed is:

1. A first composition comprising:
    a fire-resistant thermoplastic resin, comprising:
       1-15 wt % of an aryl phosphate, the aryl phosphate including a resorcinol bis(diphenyl phosphate);
       1-15 wt % of a phosphonate polymer; and
       70%-98 wt % of a (meth)acrylic polymer including units resulting from at least one monomer, wherein the monomer includes methyl methacrylate.

2. The first composition of claim 1, further comprising at least one of a fabric or a composite material embedded with the fire-resistant thermoplastic resin.

3. The first composition of claim 2, wherein the at least one of the fabric or the composite material comprises at least one of a carbon fiber, a glass fiber, or a natural fiber.

4. The first composition of claim 2, wherein the at least one of the fabric or the composite material is configured to pass flame requirements as set forth in 14 C.F.R. § 25.853 and corresponding Appendix F.

5. The first composition of claim 2, wherein the at least one of the fabric or the composite material is infused within the fire-resistant thermoplastic resin before at least one of the phosphonate polymer or the (meth)acrylic polymer is polymerized.

6. The first composition of claim 2, wherein at least one of the phosphonate polymer or the (meth)acrylic polymer is a product of polymerization of the at least one monomer or the phosphonate polymer between 10° C. and 40° C.

7. The first composition of claim 1, wherein the fire-resistant thermoplastic resin further comprises an anti-drip agent.

8. The first composition of claim 1, wherein the fire-resistant thermoplastic resin further comprises a colorant.

9. The first composition of claim 1, wherein the fire-resistant thermoplastic resin further comprises a polymerization initiator.

10. The first composition of claim 1, further comprising an initiator, wherein the initiator is configured as a peroxide.

11. The first composition of claim 1, wherein at least one of an effective heat of combustion, a peak heat release, or a flame time of the first composition is less than a second composition comprising only the aryl phosphate or the phosphonate polymer, wherein a total weight percentage of the aryl phosphate or the phosphonate polymer in the second composition is equivalent to the total weight percentage of the aryl phosphate and the phosphonate polymer in the first composition.

12. The first composition of claim 1, wherein the fire-resistant thermoplastic resin comprises 5 wt % of the resorcinol bis(diphenyl phosphate).

13. The first composition of claim 12, wherein the fire-resistant thermoplastic resin comprises 5 wt % of the phosphonate polymer.

* * * * *